United States Patent
Mohassel et al.

(10) Patent No.: US 12,316,621 B1
(45) Date of Patent: May 27, 2025

(54) AUTHENTICATING ANONYMOUS INFORMATION

(71) Applicant: WhatsApp LLC., Menlo Park, CA (US)

(72) Inventors: Payman Mohassel, San Jose, CA (US); Shuangying Huang, Sunnyvale, CA (US); Subodh Iyengar, Palo Alto, CA (US); Sundararaman Jeyaraman, Hayward, CA (US); Chen-Kuei Lee, Sunnyvale, CA (US); Zutian Luo, Pasadena, CA (US); Ananth Raghunathan, Mountain View, CA (US); Shaahid Shaik, Fremont, CA (US); Yen-Chieh Sung, Cupertino, CA (US); Liuqing Albert Zhang, Redwood City, CA (US); Xian Xu, Menlo Park, CA (US)

(73) Assignee: WhatsApp, LLC, Menlo Park, CA (US)

( * ) Notice: Subject to any disclaimer, the term of this patent is extended or adjusted under 35 U.S.C. 154(b) by 273 days.

(21) Appl. No.: 17/571,891

(22) Filed: Jan. 10, 2022

Related U.S. Application Data

(60) Provisional application No. 63/136,783, filed on Jan. 13, 2021.

(51) Int. Cl.
*H04L 9/40* (2022.01)
*H04L 9/32* (2006.01)

(52) U.S. Cl.
CPC ............ *H04L 63/08* (2013.01); *H04L 9/3242* (2013.01)

(58) Field of Classification Search
CPC .............................. H04L 63/08; H04L 9/3242
See application file for complete search history.

(56) References Cited

U.S. PATENT DOCUMENTS

| 10,643,001 B2 | 5/2020 | Guglani et al. |
| 2005/0125378 A1 | 6/2005 | Kawada |

(Continued)

FOREIGN PATENT DOCUMENTS

| WO | 2010025075 A2 | 3/2010 | |
| WO | 2014081494 A1 | 5/2014 | |
| WO | WO-2015013548 A1 * | 1/2015 | ........... G06Q 20/385 |

OTHER PUBLICATIONS

Wikipedia entry for HMAC—Archived on Dec. 11, 2020, retrieved on Dec. 11, 2023 from https://web.archive.org/web/20201211212934/https://en.wikipedia.org/wiki/HMAC.*

(Continued)

*Primary Examiner* — Matthew T Henning
(74) *Attorney, Agent, or Firm* — Eversheds Sutherland (US) LLP

(57) ABSTRACT

A system and method comprising collecting analytics data or other types of analytics-related information from client devices in an anonymous and authenticated manner. A client device may use or provide a token or token-relation information, which may have been obtained from system servers beforehand, with a request to log the analytics data to the system servers in order to authenticate the analytics data being logged. The system servers may then authenticate the token or the token-related information, and in response to successful authentication, process the analytics data. Advantageously, the use of the token or token-related information allows the analytics data to be logged by client devices anonymously to preserve privacy, but also in a highly secure manner.

15 Claims, 12 Drawing Sheets

(56) References Cited

U.S. PATENT DOCUMENTS

| | | | |
|---|---|---|---|
| 2010/0058454 A1* | 3/2010 | Neystadt | G06F 21/44 |
| | | | 726/10 |
| 2014/0082366 A1* | 3/2014 | Engler | H04L 9/3242 |
| | | | 713/181 |
| 2015/0244681 A1* | 8/2015 | Blumenfeld | H04L 9/30 |
| | | | 713/168 |
| 2018/0212956 A1* | 7/2018 | Sanganabhatla | H04L 63/0838 |
| 2020/0117831 A1 | 4/2020 | Eckhard et al. | |

OTHER PUBLICATIONS

Davidson A., et al., "Privacy Pass: Bypassing Internet Challenges Anonymously," Proceedings on Privacy Enhancing Technologies, Jun. 1, 2018, vol. 2018, No. 3, pp. 164-180, Retrieved from the Internet: https://www.betsymposium.org/2018/files/papers/issue3/popets-2018-0026.pdf.

European Search Report for European Patent Application No. 22151251.0, mailed May 11, 2022, 7 pages.

Rahman S.U., et al., "Secure Crash Reporting in Vehicular Ad hoc Networks," Security and Privacy in Communications Networks and the Workshops, Sep. 17, 2007, pp. 443-452.

EPO—Office Action mailed Nov. 26, 2024 for European Patent Application No. 22151251.0, filed on Jan. 13, 2022, 5 pages.

* cited by examiner

201

AUTHENTICATING ANONYMOUS INFORMATION

RELATED APPLICATIONS

This application claims the benefit of priority under 35 U.S.C. § 119 (e) to U.S. Provisional Patent Application No. 63/136,783, filed on Jan. 13, 2021, which is hereby incorporated by reference in its entirety.

BACKGROUND

Some services, such as communications services, messaging services, and social networking services, allow users to exchange messages with other users. In some cases, it may be helpful for system maintenance or other system-related purposes to capture data about how the messaging service is being used (e.g., how many times a user profile is viewed by others). However, it may be undesirable to capture or collect this data if the data can be connected back to a particular user, as this may violate user privacy. And even if the captured data is anonymized, the system may be vulnerable to outside attacks, such as attackers corrupting the data being captured by the system or spamming the system.

DETAILED DESCRIPTION

Figure 1:
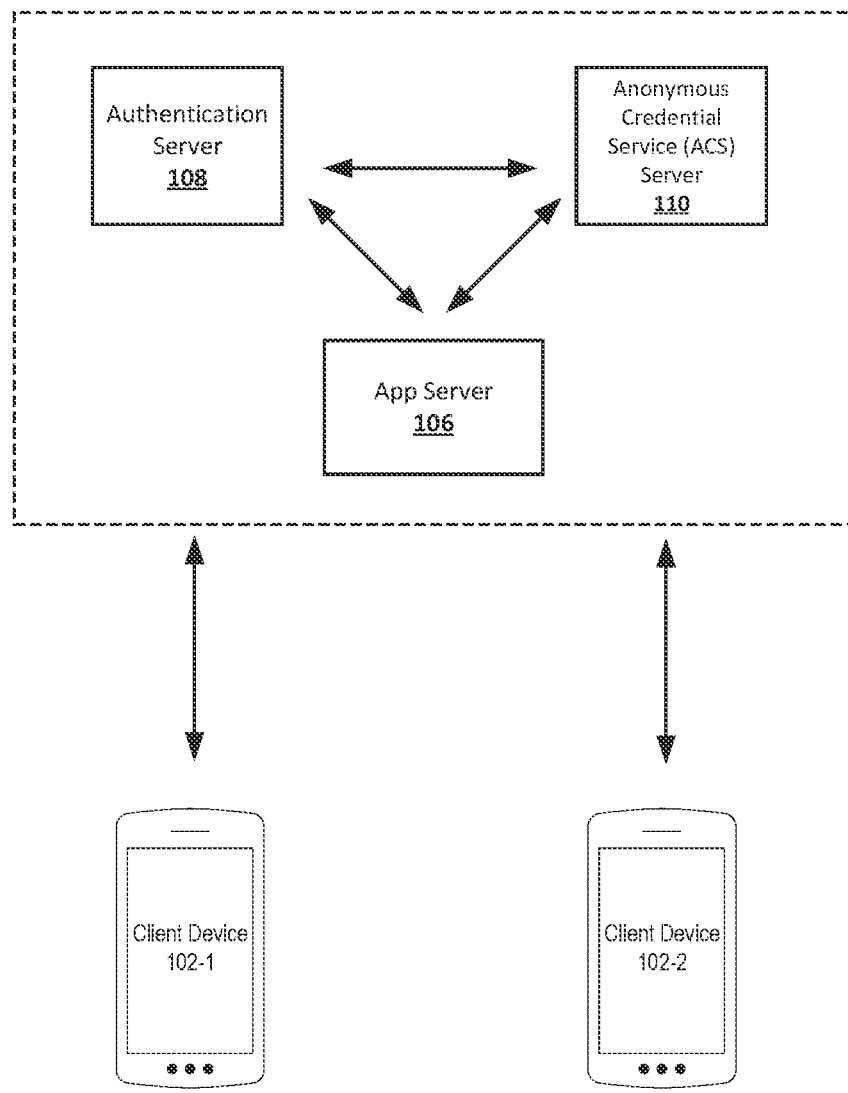
FIG. 1 depicts an exemplary communication system.

Exemplary embodiments are directed to techniques for collecting analytics data (e.g. telemetry data) or other types of analytics-related information from client devices in a communication system, e.g., end-to-end encrypted (E2EE) messaging system, in an anonymous and authenticated manner. As described above, the origin or identity associated with the data or information being collected at the one or more communication system servers (e.g., backend system servers) may be anonymized or obfuscated to protect the privacy of the users of the communication system while allowing the system to understand more about feature usages and performance related metrics from the users. For a client device to send or "log" the analytics data anonymously, the logging request or the data logs cannot contain any information revealing user identity. The anonymization of the source or identity of the data, however, may open the possibility for unauthorized users (e.g., attackers) to potentially corrupt the data being sent to the communication servers or even spam the servers. To protect against these types of vulnerabilities, only logging requests from legitimate users may be accepted by the communication servers while still enabling anonymous logging.

As will be further described in detail below, one or more communication system servers may verify user legitimacy by authenticating a token sent with the logging request. In examples, the token may be obtained by a client device from the servers via an authenticated connection prior to sending the logging request. It may be understood that the token may be any key (secret or otherwise), signature, credential, or otherwise any secret information that can be sent (e.g., hashed) with the analytics data or information to the servers. The tokens issued by the servers are anonymized (e.g., information contained in the token does not identify or link to a specific user). Each token issued by the servers may be use-limited such that the token can be used only a predetermined number of instances (e.g., otherwise known as a "use limit"). In some examples, the client device may receive more than one token from the servers in a batch. It may be possible that a predetermined number of tokens may be distributed to each client device (e.g., otherwise referred to as a "rate limit") to mitigate potential spamming at scale.

When the client device logs the analytics data, it may attach to or send the token with the analytics data, which may be collectively referred to as a log request. For example, the token may be a key-hashed message authentication code (HMAC), which may be applied to the data as part of the log request. In other examples, the token may simply be sent with the data. The one or more communication system servers validate the token. Moreover, the one or more servers may determine whether the token has exceeded the predetermined use count, e.g., the number of times the token can be used, as described above. Once the integrity of the log is verified, the one or more servers may determine whether to proceed with storing, analyzing, and/or processing the analytics data. Further, the results of the integrity check of the token may be provided to the client device.

While the anonymous and authenticated logging of the analytics data may be primarily performed in E2EE-based communication systems, it may be understood that any type of communication system (e.g., non-E2EE communication systems, hybrid communication systems including both non-E2EE and E2EE-based systems) may also perform the anonymous and authenticated logging of the analytics data in a similar manner.

The exemplary embodiments presented and described herein are advantageous in numerous ways. For example, the analytics data can be logged to the one or more communication system servers anonymously but also in an authenticated manner. By requiring client devices to use tokens to prove the legitimacy of the analytics data being logged, system corruption and security vulnerabilities can be mitigated. Moreover, the tokens themselves remain anonymous, e.g., specific users cannot be linked to specific tokens. Moreover, the scalability of the system is another advantage. For instance, scalability is possible via the simplicity and efficiency of the token-based authentication features of the system such that, e.g., client devices that are underpowered on the network can still utilize the technology, and further possible by the reusable nature and transferability of the credentials, e.g., the tokens can be reused multiple times (which can be limited) and can be transferred to other client devices (which can also be limited).

A Note on Data Privacy

The above brief summary is intended to serve as a non-limiting introduction to the concepts discussed in more detail below. However, before discussing further exemplary embodiments, a brief note on data privacy is first provided. A more detailed description of techniques for authenticating anonymized information will be addressed in connection with the following Figures.

Some embodiments described herein make use of data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

Exemplary System

FIG. 1 depicts an exemplary communication system 100 for logging analytics data (e.g., telemetry data) to the system 100 by one or more client devices according to one or more embodiments. The communication system 100 may be included in or may be part of a larger communication system, such as an end-to-end encrypted (E2EE) communication system, as will be further described below. Moreover, the communication system 100 may be part of or implemented in a messaging platform (e.g., social networking platform, social media platform, standalone messaging platform, etc.). The system 100 may include at least one or more client devices 102-1, 102-2 and one or more system backend servers 104, which includes at least an app server 106, an authentication server 108, and an anonymous credential service (ACS) server 110.

As shown, the app server 106, the authentication server 108, and the ACS server 110 may be interconnected and configured to communicate among each other. In one example, the app server 106 facilitates the logging requests from the one or more client devices 102-1, 102-2, and in response to the logging requests being legitimate and authenticated, the app server 106 then further processes the received analytics data, e.g., determines whether to proceed with logging the data. In another example, the authentication server may be configured to perform identity verification of users requesting tokens for logging the analytics data to the system 100.

In yet a further example, the ACS server 110 may manage the creation and distribution of the tokens. The ACS server 110 may also verify or authenticate tokens that are attached to or included in the logging requests to ensure they are legitimate and further keep track of the use limits associated with each token and the rate limits associated with each user. Moreover, it may be understood that the tokens generated and maintained by the ACS server 110 are anonymized such that they cannot be traced or linked back to a specific user.

As will be further described in detail below, one or more of the app server 106, the authentication server 108, and the ACS server 110 may work together to at least perform and facilitate two distinct workflows: generating and sending anonymized tokens to the client devices (e.g., prior to the client devices logging the analytics data) and authenticating the tokens sent back to the servers by the client devices to ensure that the log requests by the users are legitimate.

While only one of each type of server is shown in FIG. 1, it may be understood that more than one of each type of server can be included in the system 100, e.g., multiple app servers, multiple authentication servers, multiple ACS servers may be arranged and configured as part of the system 100. It may also be understood that the configuration of communication system 100 may not be limited to FIG. 1; rather, it is possible for various other system components to be included in the system for facilitating and authenticating the anonymous analytics data being logged to the system.

Exemplary Data Flow of Token Request

Figure 2A:
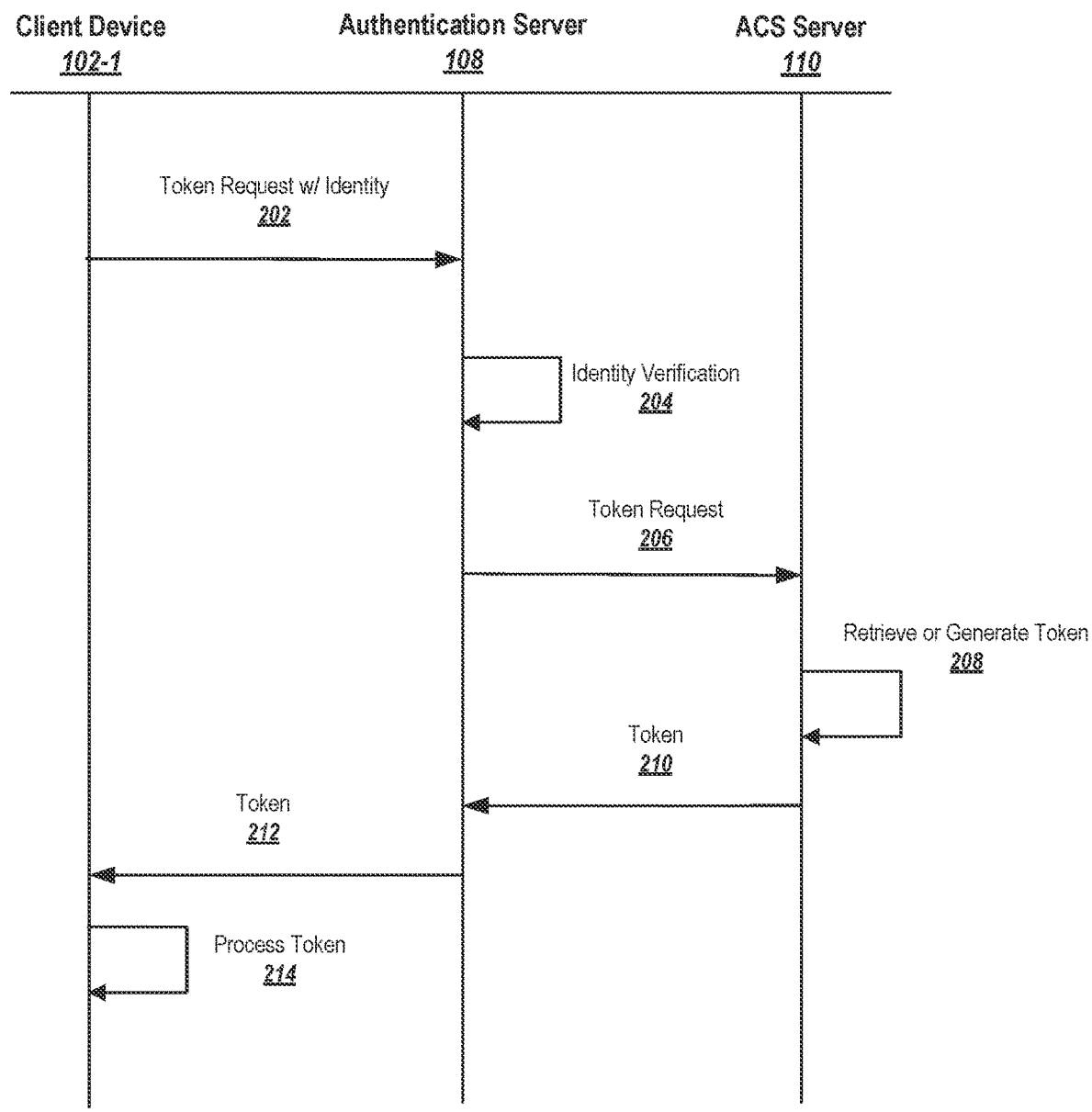
FIG. 2A depicts an exemplary data flow diagram for token request.

FIG. 2A depicts an exemplary data flow diagram 201 according to one or more embodiments. The data flow diagram 201 illustrates the data flow associated with a client device requesting a token for later logging of analytics data. For ease of explanation, system 100 of FIG. 1 and the components thereof will be used to describe the features of the data flow diagram 201. The data flow diagram 201 shows the communicative data interaction and flow among at least the client device 102-1, the authentication server 108, and the ACS server 110.

According to examples, the client device 102-1 may send a token request to the authentication server 108 at flow 202 to obtain a token. The token request may include user identity or any information that identifies the user. At flow 204, the authentication server 108 verifies the identity of the user to ensure that the user is a legitimate user of the communication system and not unauthorized. In response to successful verification of the user's identity, the authentication server 108 may indicate to the ACS sever 110 that there was a positive identity verification event and that a token is being requested at flow 206.

The ACS sever 110, in response to receiving such indication and request, may then generate or retrieve a token at flow 208. As described above, the token may be anything that can be authenticated, validated, verified by the ACS server 110 (or anything that can be used by the ACS server to authenticate, validate, or verify), such as a unique signature, a unique credential, a key (secret or otherwise), a cryptographic function, a series of alphanumeric numbers, a passcode, a password, etc. For example, the token can include a cryptographic hash function (e.g., MAC algorithm) of an HMAC scheme, which may be referred to as a secret key. The hash function can be used by the client device 102-1 to generate a unique MAC and can be sent with a logging request. Thus, when the ACS server 110 receives MAC with the logging request, the server can compare the received MAC with the MAC that it calculates with the same cryptographic hash function. If they match, the ACS server 110 can verify that the logging request is legitimate. It may be understood that the ACS server 110 may be configured to catalogue, organize, and/or manage all tokens (pre-generated or otherwise or issued to client devices or otherwise) in any suitable manner for efficient and easy verification or authentication of tokens received with logging requests.

Moreover, another important and advantageous feature of the ACS server 110 is ensuring that the token is kept or remains anonymous. Thus, the token issued to the client device 102-1 cannot be traced or linked back to the client device 102-1, nor can it be traced or linked to the user associated with the client device 102-1. As set forth above, the ACS sever 110 may apply and manage a use limit on each token and may keep track of such limits. Similar to use limits, the ACS server 110 may also implement time limits or expiration durations for one or more of the tokens.

The ACS sever 110 may then forward the token to the authentication server 108 at flow 210. The authentication server 108 may then forward the token to the client device 102-1 at flow 212. In some examples, the authentication server 108, or both in some instances, may keep track of the rate limit associated with the client device 102-1, e.g., how many tokens has the client device 102-1 requested and received within a predefined period of time, has that number exceeded the rate limit, etc. This advantageously ensures that even if an authorized user obtains legitimate tokens and uses them to log analytics data, that authorized user cannot obtain an unlimited number of tokens and spam the system servers. The client device 102-1 may process the token at flow 214.

In further examples, the client device may request tokens in batches in accordance with predefined rate limits. It may be understood that because the tokens are anonymized, the tokens may be transferable to, and can be used by, other client devices. Moreover, the authentication server 108 and the ACS sever 110 may coordinate different and various and suitable ways to provide the client device 102-1 tokens. For example, the tokens can be encrypted by the ACS server, which requires the client device 102-1 to properly decrypt the token to utilize content therein.

Exemplary Data Flow of Logging Request

Figure 2B:
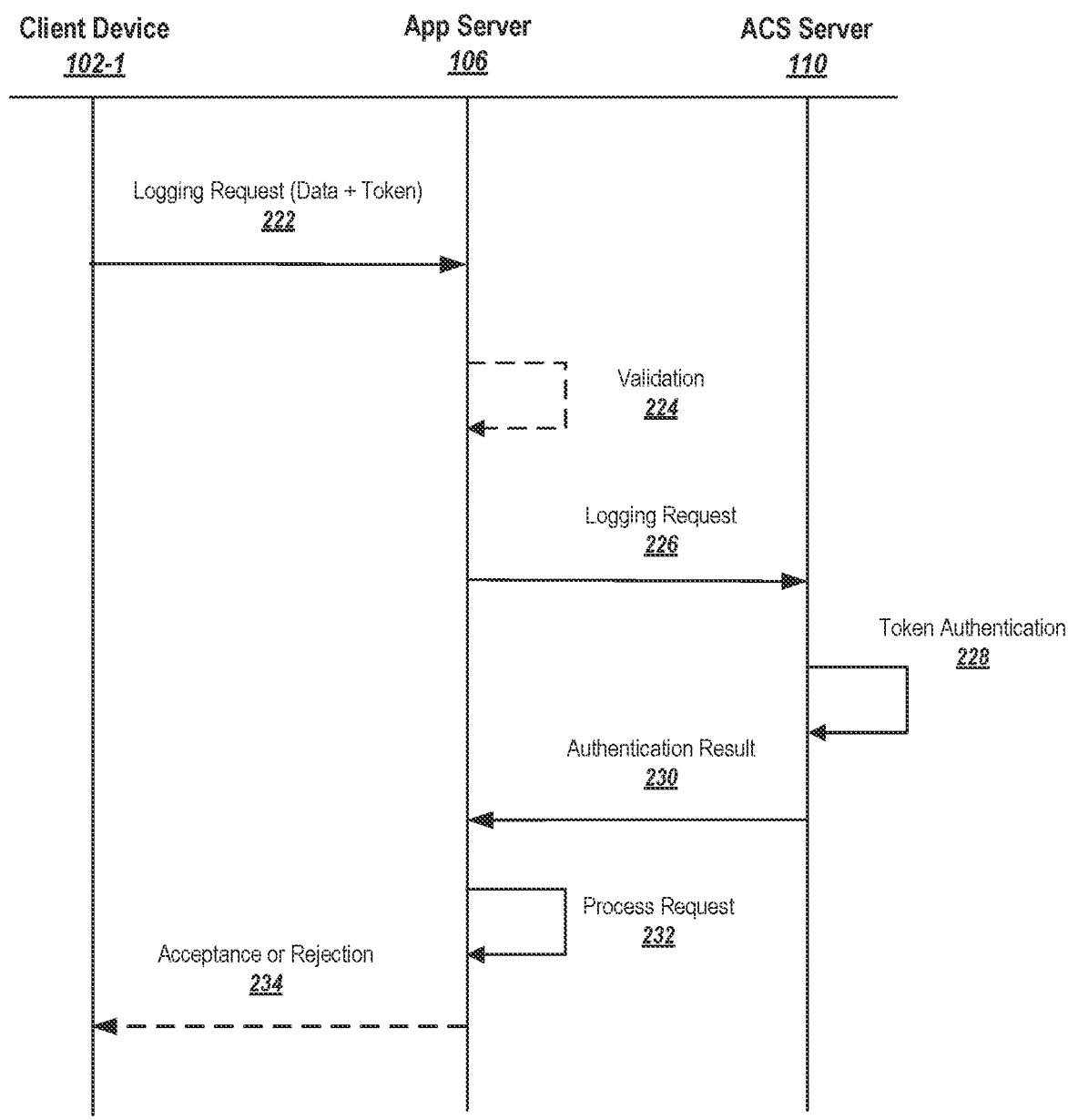
FIG. 2B depicts an exemplary data flow diagram for logging request.

FIG. 2B depicts an exemplary data flow diagram 221 according to one or more embodiments. The data flow diagram 221 illustrates the data flow associated with a client device requesting to log (and, in some instances, eventually logging) analytics data to the system servers. For ease of explanation, again, system 100 of FIG. 1 and the components thereof will be used to describe the features of the data flow diagram 221. The data flow diagram 221 shows the communicative data interaction and flow among at least the client device 102-1, the app server 106, and the ACS server 110.

In examples, the client device 102-1 may send a logging request to app server 106 at flow 222. As shown, the logging request (which may otherwise be referred to as a log payload) may include the analytics data and a token, such as the token obtained in FIG. 2A, which is used to authenticate the legitimacy of the logging request and/or the analytics data. It is understood that the logging request is anonymous, e.g., the logging request cannot be tracked or linked to a particular client device or user. Moreover, the connection between the client device 102-1 and the app server 106 may be considered unauthenticated. As described above, the token can be included in or attached with the logging request itself. In other examples, information derived from the token (e.g., MAC calculation via a secret cryptographic function or algorithm) may be provided with the logging request.

When the app server 106 receives the request, the app server 106 may determine whether, or validate that, the request indeed contains a token at flow 224. As such, the app server 106 may initially filter out all logging requests that do not contain a token with the request so as to reduce the burden on the ACS server 110 to make such determination. It may be understood that flow 224 may be an optional step, as indicated by the dashed arrow.

The app server 106 may forward the received logging request to the ACS server 110, as shown at flow 226. In some instances, the entire logging request, which contains both the token and the analytics data, may be sent to the ACS server 110. In other instances, e.g., where it is possible to extract the token from the logging request, only the token may be forwarded to the ACS server 110. By sending only the token, the ACS server 110 receives only the necessary information to authenticate the token, and thus, the server is not overwhelmed or inundated with extra data or information, which may advantageously improve efficiency and scalability.

At the ACS server 110, the token is authenticated at flow 228. For example, the ACS server 110 may determine whether the received token was a token that the ACS server 110 had previously generated and issued. Moreover, the ACS server 110 may determine whether the use limit associated with the token has been exceeded (e.g., if the use limit on the token is three uses and the ACS server 110 determines that the current use is the fourth time, the ACS server will determine that the token is invalid even though the token itself is legitimate). If it is determined that the use limit has not been exceeded, the ACS server 110 may update (e.g., decrease) the limit number by one.

The ACS server 110 may then send the authentication result to the app server 106 at flow 230. Thereafter, the logging request is processed at flow 232. The processing may involve the app server 106 to verify the integrity of the log and the data contained therein and/or further verify that the data contained in the log is proper (e.g., the data is actually analytics data, telemetry data, etc.). The app server 106 may also determine whether it will proceed with the logging request. In some instances, the app server 106 may determine that the analytics data contained in the logging request is not worth logging, e.g., due to redundancy, inefficiency, being unhelpful, etc. At flow 234, an acceptance or rejection notification may be sent to the client device 102-1, which may be optional as indicated by the dashed arrow.

As described above, the logging request sent by the client device 102-1 to the app server 106 may contain at least the analytics data and the token. As further described above, the token may include at least a message authentication code (e.g., keyed-hash message authentication code, HMAC), which may involve a cryptographic hash function (e.g., a secret cryptographic key). The message may be passed through the hash function, e.g., the secret cryptographic key, to derive a specific MAC. This MAC may be appended to or included in the message to the ACS server 110, which can then calculate a MAC by running the message through the secret key, and determine whether the MAC calculated by the ACS server 110 matches the MAC appended to the message of the logging request. It may be understood that the ACS server 110 may catalogue and manage the various secret cryptographic keys, such as when they are in effect or not in effect, expiration times, complexity of the hash functions, etc.

Exemplary Logic

Exemplary logic for implementing the above-described embodiments is next described in connection with FIG. 3. The exemplary logic may be implemented in hardware, software, or a combination of hardware and software (e.g., being implemented at least partially in hardware).

Figure 3:
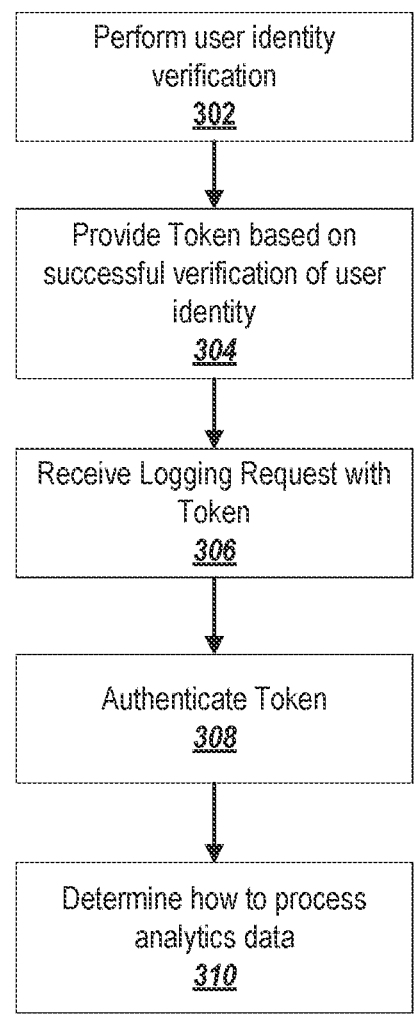
FIG. 3 depicts an exemplary flow diagram for authenticating anonymous information in end-to-end encryption systems.

FIG. 3 is a flowchart depicting exemplary logic 301 for authenticating the anonymized information being logged to the system servers in end-to-end encryption systems, as described above. The logic 301 may be embodied as digital logic, which may be implemented at least partially in hardware, embodying instructions for a processor circuit to perform the steps described below. The hardware may reside or configured in one or more communication system servers (e.g., access server, authentication server, ACS server). Although FIG. 3 depicts a particular arrangement of logical elements in a particular order, it is understood that the configuration depicted in FIG. 3 is but one example. In other embodiments, more elements may be provided and/or some elements may be omitted, some elements may be performed in parallel, and/or elements may be performed in a different order.

At block 302, user identity verification may be performed when a token request is received from a client device. The token request may include the identity (or information related thereto) of the user associated with the client device. Thus, the connection between the requesting client device and the backend server(s) may be considered a secure and/or authenticated connection. As described above, the user identity verification is performed to ensure that the user of the client device requesting the token request is indeed a legitimate and authorized user of the communication system and not a fraudster, not an attacker, etc. The identity verification may be carried out by comparing the identity information received in the token request with user data (indexed, stored or otherwise) residing on the backend system server(s). For example, user identity information may include a mobile or telephone number.

In response to a successful or positive user identity verification, a token may be provided to the client device at block 304. As set forth above, the token may be anything (e.g., credential, signature, key, cryptographic functions or algorithms, codes, alphanumeric strings) that can be authenticated or verified by the backend server(s). Tokens may be issued to the client device in batches, and each token may be use limited. Moreover, the token is anonymized such that the server(s) issuing the token does not know it is being issued to a particular client device or user.

At block 306, a logging request may be received. The logging request may include the analytics data to be logged to the backend system and may be in the form of a message. The logging request may also include the token, e.g., the token that was provided at block 304. In other examples, the logging request may include information derived from the token, such as a MAC derived from a cryptographic algorithm or function, as described above. In that example, MAC may be provided, and the backend server(s) may take the message and compute its own MAC using the same cryptographic algorithm. If the two MACs match, then the token is deemed authentic, and the logging request can be properly validated at block 308. If the logging request contains the token, the backend server(s) may determine whether the token is authentic at block 308 (e.g., compare the token against indexed or catalogued tokens, determining how and when the token was generated and provided, etc.).

At block 310, the server(s) may determine how to process the logging request and the analytics data contained therein in response to the token being successfully authenticated at block 308. For example, the server(s) may determine to proceed with logging the analytics data and/or performing further analysis on the same. In another example, the server (s) may determine that the analytics data contained in the logging request is not worth logging, e.g., due to redundancy, inefficiency, being unhelpful, etc. While not shown, the system server(s) may send the client a notification that the logging request was either accepted or denied.

Exemplary Features for Deployment at Scale (E.g., Scalability)

Encryption curve choice. In examples, and as will be further described below with respect to exemplary E2EE communication systems, any suitable encryption curve may be used for communication protocol, e.g., RSA, Elliptic curve-based algorithms, Curve25519, etc. To mitigate potential static DH attacks against the Curve25519, more frequent key rotations can be implemented.

Unlinkability guarantees. The examples and/or embodiments described herein allow analytics data, such as the number of people on the communication system having experienced an app crash (as opposed to the total number of crashes), to be logged without knowing sensitive details about the users who experienced the crash. To maintain the anonymity of the users, it may be understood that a pseudonymous identifier for each user or client may be rotated periodically and sent along with the log payload. Thus, users or clients are able to control their pseudonymity while providing useful aggregate information linked by ephemeral identifiers, for instance. Moreover, as described above, each token may have a use limit, e.g., where the token is used a small number of times before the tokens become invalid, such as 64 times per day.

Side channels. In examples, to ensure that the anonymity of the client device or user associated therewith remain when the client device sends a log request to the system servers, the IP address of the anonymous requests at the one or more edge servers so that the logging server(s) do not have access to the addresses.

Reidentification or joinability. In examples, the potential risk of user reidentification (e.g., through the inherent nature of the analytics data collected, or by joining the analytics data with other types of data available on the backend system) can be reduced or mitigated by actively measuring the potential of reidentification or joinability of the collected data and determining whether an alert is to be issued based on predefined thresholds that are met or exceeded. Thus, this allows the collection of data that has high reidentification potential to be stopped. Moreover, access to telemetry data that require additional privacy may be protected through, e.g., a differentially private querying infrastructure.

Rate limiting. As described above, since anonymous tokens are not linked to a specific client device or user, the tokens may be transferable between users. To mitigate potential risks for attackers to obtain the tokens and spam the system, rotation of the keys associated with tokens (in applicable examples) may be used to rate limit users. For example, the number of tokens to a single client device can be limited (e.g., per public key and rotate the keys to expire the tokens). For logging requests, the logging server may also track the number of times a unique token has been redeemed and may reject the request if the token has already redeemed more times than a predetermined number or preset threshold.

Communication cost and token reuse. To save time and make efficient total communication costs in the communication system, tokens can be reused a predefined number of times, as described above. Moreover, it may be understood that ACS servers may be deployed locally in relation to the app servers to reduce latency from cross-region traffic or the like.

Exemplary End-to-End Encryption System

Figure 4:
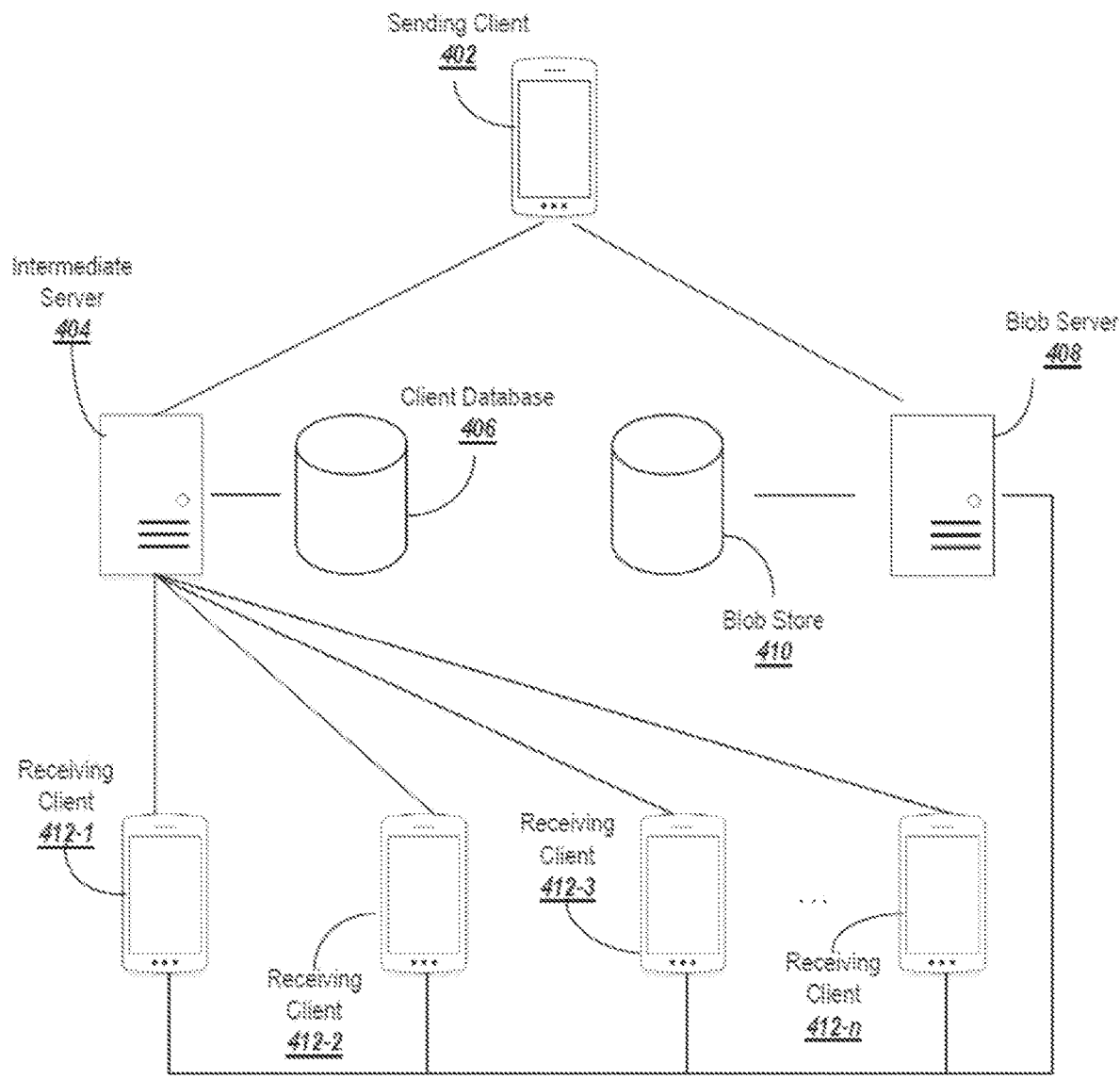
FIG. 4 depicts an exemplary system suitable for applying end-to-end encryption to messages.

As shown in FIG. 4, exemplary embodiments may provide end-to-end encryption between a sending client 402 and a receiving client 412-$i$ facilitated by an intermediate server 404. Some embodiments described herein utilize server-side fan out to transmit group messages and broadcasts. In a server-side fan out procedure, the sending client 402 transmits a single copy of the message to the server 404, which then transmits a copy of the message to the appropriate recipient clients 412-$i$, as illustrated in FIG. 4.

All communication between clients 402, 412 and servers 404 may be layered within a separate encrypted channel. End-to-end capable clients may use, for example, Noise Pipes with Curve25519, Advanced Encryption Standard Galois/Counter Mode (AES_GCM), and Secure Hash Algorithm 256 (SHA256) from the Noise Protocol Framework for long running interactive connections. The parameters for setting up the encrypted channel may be stored in a client database 406 at the server 404.

Such a configuration provides several desirable properties including fast, lightweight connection and resume; encryption of metadata to hide it from unauthorized network observers; information about the connecting user's identity is not revealed; and no client authentication secrets are stored on the server 404. Clients may authenticate themselves using a Curve 25519 key pair, so the server only stores a client's public authentication key. If the server's user database 406 is ever compromised, no private authentication credentials will be revealed.

In order to transmit media and/or attachments in an encrypted manner, the communications system may also include a blob server 408 hosting a blob store 410. Use of the blob store 410 to transmit content (particularly in conjunction with sending an ephemeral content message) is described in more detail below.

Exemplary Encryption Protocol and Data Structures

This section describes an exemplary encryption protocol and data structures suitable for use in end-to-end encryption. Although embodiments are illustratively described herein with regards to specific examples, the present invention is not limited to the examples described. Some aspects described herein may be used with any type of communications system or encryption protocol, while others may be preferably employed in connection with an end-to-end encrypted communications system.

An example of an encryption protocol suitable for use with exemplary embodiments is the Signal Protocol designed by Open Whisper Systems of San Francisco, California. Exemplary embodiments may also utilize the anonymous key agreement protocol Elliptic Curve Diffie-Hellman (ECDH). Nonetheless, other encryption protocols and key agreement protocols may also be suitable for use with exemplary embodiments.

Advantageously, end-to-end encrypted protocols may prevent third parties (and even the communications service itself) from having plaintext access to messages transmitted by the service. Even if encryption keys from a user's device are physically compromised, they cannot be used to go back in time to decrypt previously transmitted messages.

Figure 5A:
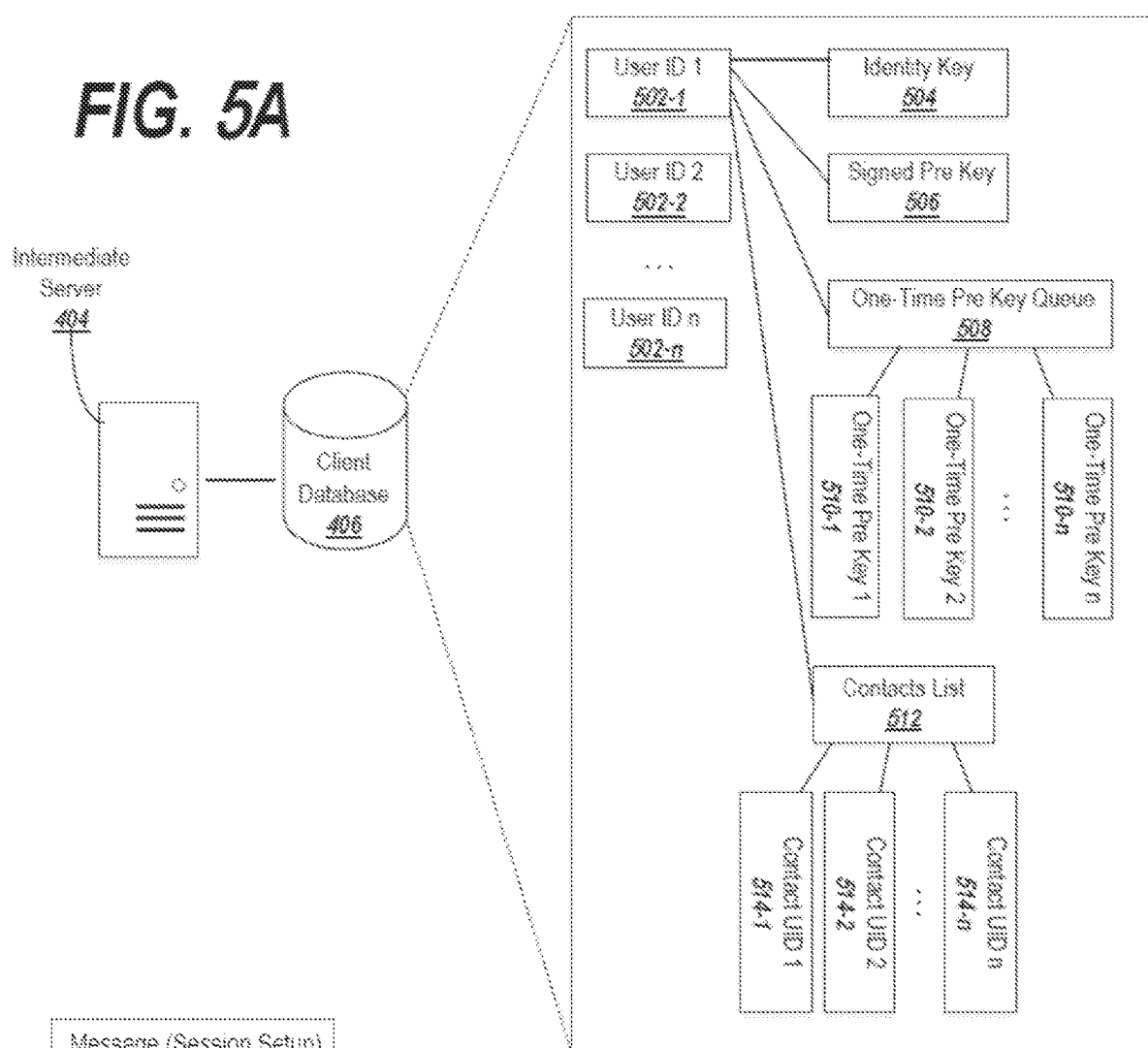
FIGS. 5A to 5C depict exemplary end-to-end encryption protocols and data structures.

In order to use end-to-end encryption, a user may initially register with the communications service. The user's registration information may be stored in the client database 406, as shown in FIG. 5A. Each user may be associated with an entry 502-$i$ indexed by an identifier assigned to the user account.

At registration time, an application of the communications service associated with the registering user may transmit a public identity key 504, a public signed pre key 506 with its signature, and a batch of public one-time pre keys 510-$i$ to the intermediate server 404.

In one embodiment, the identity key 504 may be a long-term Curve25519 key pair, generated at the time that the application is installed on the client device. The signed pre-key 506 may be a medium-term Curve25519 key pair, generated at install time and signed by the identity key. The signed pre-key 506 may be rotated on a periodic basis. The one-time pre keys 510-$i$ may be a queue 508 of Curve25519 key pairs for one-time use, generated at install time, and replenished as needed.

The server 404 may store these public keys 504, 506, 510-$i$ associated with the user's identifier 502-$i$. According to exemplary embodiments, at no time does the server 404 have access to any of the client's private keys.

In addition to the public keys 504, 506, 510-$i$, the server 404 may store a contacts list 512 including one or more contact user identifiers 514-$i$ associated with the contacts of the user account. The contacts in the contacts list 512 may be, or may be derived from, a contacts list on the user's mobile device. Some entries in the contacts list 512 may be associated with one or more flags. One example of such a flag is a blocked-user flag, indicating that the user associated with the respective contact user identifier 514-$i$ is blocked by the user account associated with the entry 502-$i$. When a user account is blocked, messages from the blocked user are not delivered to the blocking user.

In some embodiments, the intermediate server 404 may not store the contacts list 512, but may instead be capable of querying potential recipient clients for their own contacts list in order to provide the filtering functionality described below.

Figure 5B:
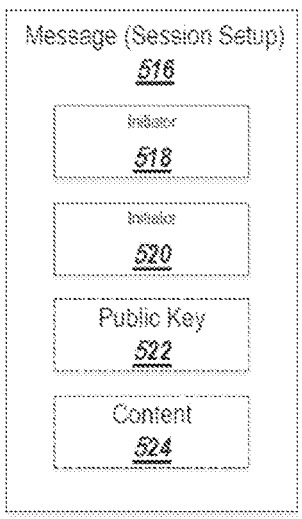

The information from the client database 406 may be used to initiate an end-to-end encrypted session; using the session information, end-to-end encrypted messages may be exchanged until the session is ended or expires. Once the session is established, clients do not need to rebuild a new session with each other until the existing session state is lost (e.g., through an external event such as an app reinstall or device change). FIG. 5B depicts an exemplary message 516 suitable for establishing an end-to-end encrypted session.

In order to establish a session, the client initiating the session ("initiator") may request the public identity key 504, public signed pre key 506, and a single public one-time pre key 510-*i* for the recipient.

In response, the server 404 may return the requested public key values. A one-time pre key 510-*i* is only used once, so it is removed from the server storage after being requested. The initiator may save the recipient's identity key 504 as $I_{recipient}$, the signed pre key 506 as $S_{recipient}$, and the one-time pre key 510-*i* as $O_{recipient}$.

The initiator may then generate an ephemeral Curve25519 key pair as $E_{initiator}$ 518. The initiator may load its own identity key 504 as $I_{inititator}$ 520. The initiator may calculate a master secret as:

$$\text{master\_secret} = ECDH(I_{initiator}, S_{recipient}) \| ECDH(E_{initiator}, I_{recipient}) \| ECDH(E_{innitiator}, S_{recipient}) | ECDH(E_{initiator}, O_{recipient}) \quad \text{Equation 1}$$

If there is no one-time pre key 510-*i* (e.g., the keys in the queue 508 had been exhausted when the initiator requested such a key and had not been replenished by the recipient), then the final ECDH may be omitted.

The initiator may use a Hashed Message Authentication Code (HMAC)-based key derivation function (HKDF) to create a root key and chain keys from the master secret, as discussed in more detail below. A root key may be a 32-byte value that is used to generate chain keys. A chain key may be a 32-byte value used to create message keys. A message key may be an 80-byte value that is used to encrypt message contents. In the message key, 32 bytes may be used for an Advanced Encryption Standard-256 (AES-256) key, 32 bytes may be used for an HMAC Secure Hash Algorithm-256 (HMAC-SHA256) key, and 16 bytes may be used for an initialization vector (IV).

After building a long-running encryption session, the initiator may immediately start sending messages 516 to the recipient, even if the recipient is offline. Until the recipient responds, the initiator may include the information (in the header of all messages sent) that the recipient requires to build a corresponding session. This includes the initiator's $E_{initiator}$ 518 and $I_{initiator}$ 520. Optionally the message may also include a public key 522 and encrypted content 524, as described in connection with FIG. 5C.

When the recipient receives a message 516 that includes session setup information, the recipient may calculate the corresponding master secret using its own private keys and public keys advertised in the header of the incoming message. The recipient deletes the one-time pre key 510-*i* used by the initiator. The initiator may use HKDF to derive a corresponding root key and chain keys from the master secret.

Once a session is established, clients may exchange messages that are protected with a message key using AES256 in cipher block chaining (CBC) mode for encryption, and HMAC-SHA256 for authentication.

The message key may change for each message transmitted, and is ephemeral such that the message key used to encrypt a message cannot be reconstructed from the session state after a message has been transmitted or received.

The message key may be derived from a sender's chain key that ratchets forward with every message sent. Additionally, a new ECDH agreement is performed with each message roundtrip to create a new chain key. This provides forward secrecy through the combination of both an immediate hash ratchet and a round trip Diffie-Hellman (DH) ratchet.

Each time a new message key is needed by a sender, the message key may be calculated as:

$$\text{Message Key} = \text{HMAC-SHA256}(\text{Chain Key}, 0x01) \quad \text{Equation 2}$$

The chain key may then be updated as:

$$\text{Chain Key} = \text{HMAC-SHA256}(\text{Chain Key}, 0x02) \quad \text{Equation 3}$$

This causes the chain key to ratchet forward, and also means that a stored message key can't be used to derive current or past values of the chain key.

Figure 5C:
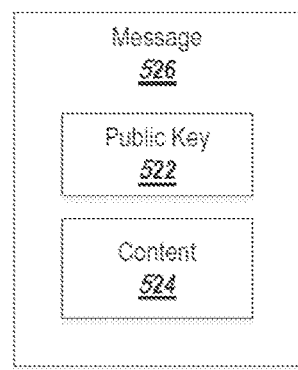

As shown in FIG. 5C, each time a message 526 is transmitted, a public key 522 (e.g., an ephemeral Curve25519 public key) may be advertised along with the encrypted message content 524. Once a response is received, a new chain key and root key may be calculated as:

$$\text{ephemeral\_secret} = ECDH(\text{Ephemeral}_{sender}, \text{Ephemeral}_{recipient}) \quad \text{Equation 4}$$

$$\text{Chain Key}, \text{Root Key} = HKDF(\text{Root Key}, \text{ephemeral\_secret}) \quad \text{Equation 5}$$

According to exemplary embodiments, a chain is only ever used to send messages from one user, so message keys are not reused. Because of the way message keys and chain keys are calculated, messages can arrive delayed, out of order, or can be lost entirely without causing problems.

In some cases, the client may need to communicate with a server of the messaging service by exchanging encrypted messages. Because a key feature of end-to-end encryption is that the intermediate server(s) should not be able to decrypt the messages sent between user devices, it is necessary to generate a different key for client-server communication. This key is generally referred to as the authentication key and is used for client-server communication in a manner similar to the identity key discussed above.

Traditional encrypted messenger apps typically employ "server-side fan-out" for group messages. A client wishing to send a message to a group of users transmits a single message, which is then distributed N times to the N different group members by the server.

This is in contrast to "client-side fan-out," where a client would transmit a single message N times to the N different group members itself.

Server-side fan out can be performed efficiently by building on the pairwise encrypted sessions outlined above. This is accomplished using sender keys. The first time a group member sends a message to a group, the sender generates a random chain key and a random signature key pair. The sender combines the chain key and the public key from the signature key into a sender key message. The sender individually encrypts the sender key to each member of the group, using the pairwise messaging protocol explained above.

For all subsequent messages in the group, the sender derives a message key from the chain key and updates the chain key. The sender encrypts the message and signs the ciphertext using the signature key. The sender transmits the single ciphertext message to the server, which does server-side fan-out to all group participants. The hash ratchet of the message sender's chain key provides forward secrecy. Whenever a group member leaves, all group participants clear their sender key and start over.

Communications System Overview

Figure 6A:
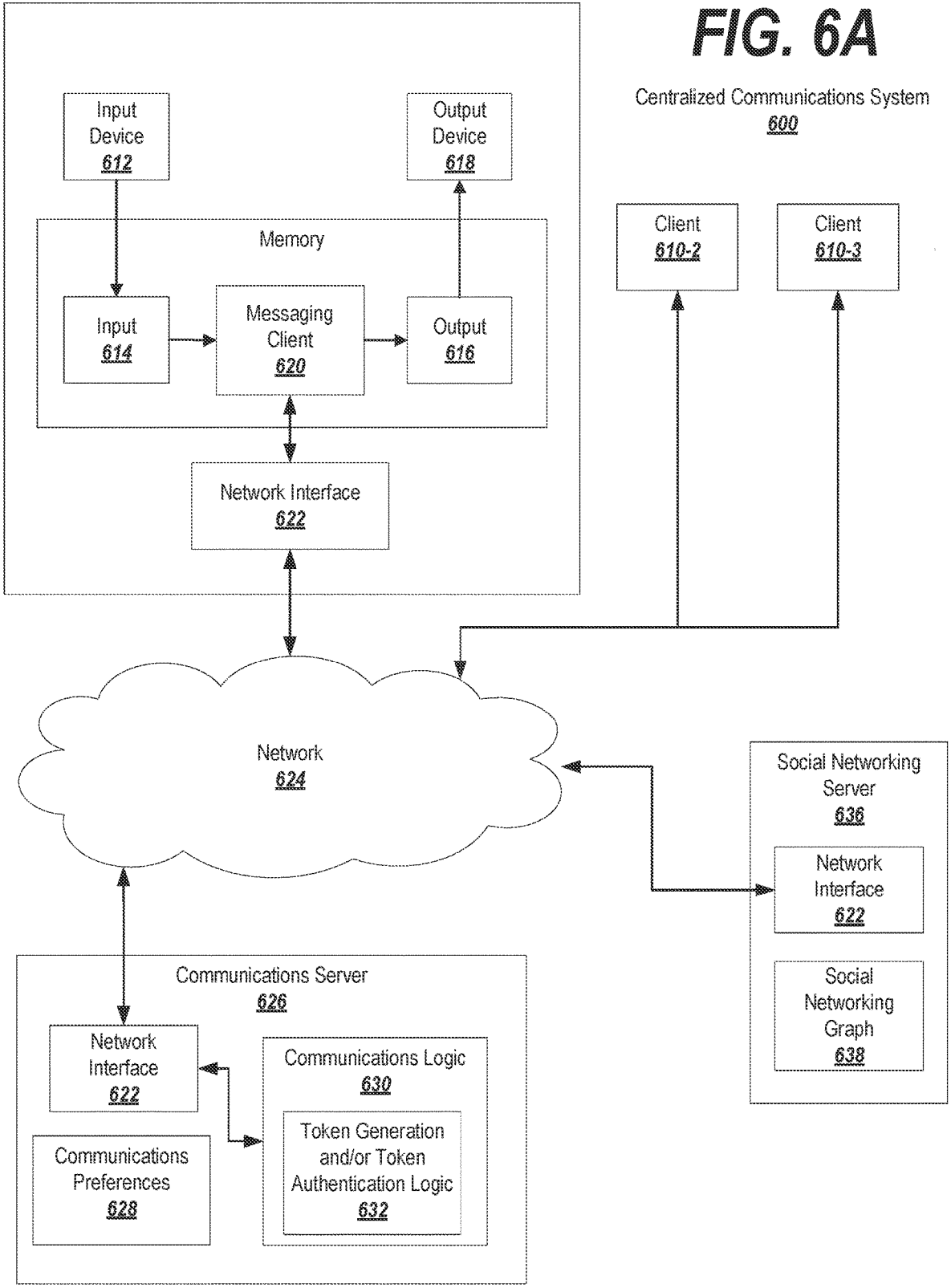
FIG. 6A depicts an exemplary centralized communications service.
Figure 6B:
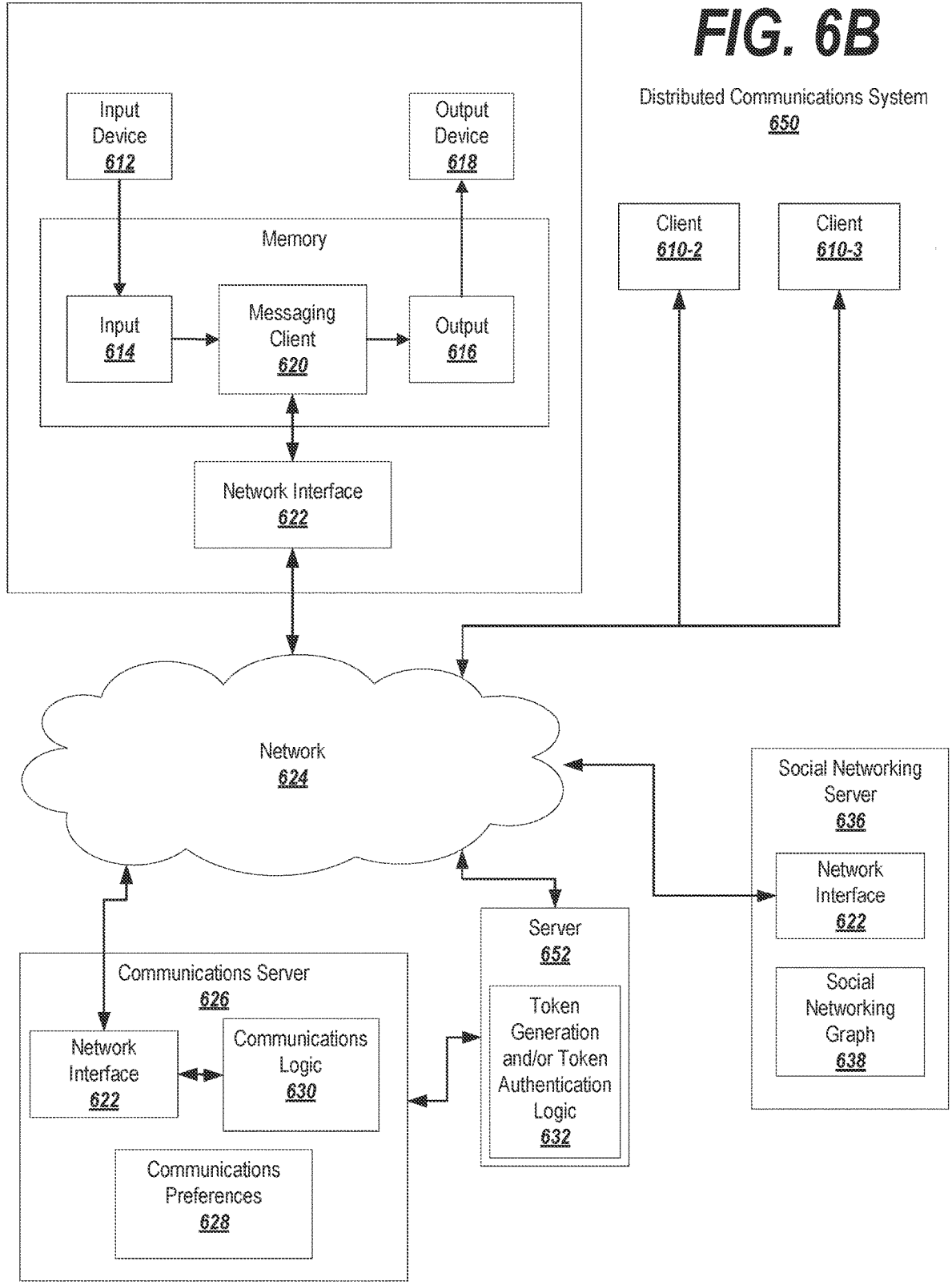
FIG. 6B depicts an exemplary distributed communications service.

These examples may be implemented by a communications system that is provided locally, at a client device, or remotely (e.g., at a remote server), or some combination thereof. FIGS. 6A and 6B depict various examples of communications systems, and are discussed in more detail below.

FIG. 6A depicts an exemplary centralized communications system 600, which facilitates encrypted communication between two or more users (e.g., business and customer). The centralized system 600 may implement some or all of the structure and/or operations of a messaging or communications service in a single computing entity, such as entirely within a single centralized messaging server device, e.g., communications server 626.

The communications system 600 may include a computer-implemented system having software applications that include one or more components. Although the communications system 600 shown in FIG. 6A has a limited number of elements in a certain topology, the communications system 600 may include more or fewer elements in alternate topologies.

A communications system 600 may be generally arranged to receive, store, and deliver communications, such as messages. The communications may include or may be associated with media or content items.

A client device 610 may transmit communications addressed to one or more recipient users, user accounts, or other identifiers resolving to receiving client devices 610. In exemplary embodiments, each of the client devices 610 and their respective messaging clients 620 are associated with a particular user or users of the communications service 600. In some embodiments, the client devices 610 may be cellular devices such as smartphones and may be identified to the communications service 600 based on a phone number associated with each of the client devices 610. In some embodiments, each client may be associated with a user account registered with the communications service 600. In general, each client may be addressed through various techniques for the reception of communications. While in some embodiments the client devices 610 may be cellular devices, in other embodiments one or more of the client devices 610 may be personal computers, tablet devices, any other form of computing device.

The client 610 may include one or more input devices 612 and one or more output devices 618. The input devices 612 may include, for example, microphones, keyboards, cameras, electronic pens, touch screens, and other devices for receiving inputs including message data, requests, commands, user interface interactions, selections, and other types of input. The output devices 618 may include a speaker, a display device such as a monitor or touch screen, and other devices for presenting an interface to the communications system 600.

The client 610 may include a memory, which may be a non-transitory computer readable storage medium, such as one or a combination of a hard drive, solid state drive, flash storage, read only memory, or random-access memory. The memory may a representation of an input 614 and/or a representation of an output 616, as well as one or more applications. For example, the memory may store a messaging client 620 and/or a social networking client that allows a user to interact with a social networking service.

The input 614 may be textual, such as in the case where the input device 612 is a keyboard. Alternatively, the input 614 may be an audio or video recording, such as in the case where the input device 612 is a microphone or camera.

The input 614 may be subjected to automatic speech recognition (ASR) logic in order to transform the audio recording to text that is processable by the communication system. The ASR logic may be located at the client device 610 (so that the audio recording is processed locally by the client 610 and corresponding text is transmitted to the communications server 626), or may be located remotely at the communications server 626 (in which case, the audio recording may be transmitted to the communications server 626 and the communications server 626 may process the audio into text). Other combinations are also possible—for example, if the input device 612 is a touch pad or electronic pen, the input 614 may be in the form of handwriting, which may be subjected to handwriting or optical character recognition analysis logic in order to transform the input 612 into processable text.

The client 610 may be provided with a network interface 622 for communicating with a network 624, such as the Internet. The network interface 622 may transmit the input 612 in a format and/or using a protocol compatible with the network 624 and may receive a corresponding output 616 from the network 624.

The network interface 622 may communicate through the network 624 to a communications server 626, which may be operative to receive, store, and forward messages between messaging clients.

The communications server 626 may include a network interface 622, communications preferences 628, and communications logic 630. The communications preferences 628 may include one or more privacy settings for one or more users and/or video communications. For example, the communications preferences 628 may include one or more settings, including default settings, for the logic described herein.

The communications logic 630 may include token generation and/or token authentication logic 632 for generating and/or authenticating tokens so that client devices can log analytics data to the system, as described above.

The network interface 622 of the client 610 and/or the communications server 626 may also be used to communicate through the network 624 with a social networking server 636. The social networking server 636 may include or may interact with a social networking graph 638 that defines connections in a social network. Furthermore, the communications server 626 may connect to the social networking server 636 for various purposes, such as retrieving connection information, messaging history, event details, etc. from the social network.

A user of the client 610 may be an individual (human user), an entity (e.g., an enterprise, business, or third-party application), or a group (e.g., of individuals or entities) that interacts or communicates with or over the social networking server 636. The social-networking server 636 may be a network-addressable computing system hosting an online social network. The social networking server 636 may generate, store, receive, and send social-networking data, such as, for example, user-profile data, concept-profile data, social-graph information, or other suitable data related to the online social network. The social networking server 636 may be accessed by the other components of the network environment either directly or via the network 624.

The social networking server 636 may include an authorization server (or other suitable component(s)) that allows users to opt in to or opt out of having their actions logged by social networking server 636 or shared with other systems (e.g., third-party systems, such as the communications server 626), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social networking server 636 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example, and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example, and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 638. Privacy settings of a social-graph element, such as a node or an edge, may specify how the social-graph element, information associated with the social-graph element, or content objects associated with the social-graph element can be accessed using the online social network. As an example, and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 636 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 636 may send a request to the data store for the object. The request may identify the user associated with the request. The requested data object may only be sent to the user (or a client system 610 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social networking server 636 or explicit connections of a user to a node, object, entity, brand, or page on social networking server 636. In addition, or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 6A may be well-suited to deployment as a new system or as an upgrade to an existing system, because the logic is incorporated into the communications server 626. In contrast, FIG. 6B depicts an exemplary distributed communications system 650, in which functionality for selecting dominant/relevant participants and displaying a reduced-size interface is distributed and remotely accessible from the messaging server. Examples of a distributed system 650 include a client-server architecture, a 3-tier architecture, an N-tier architecture, a tightly coupled or clustered architecture, a peer-to-peer architecture, a master-slave architecture, a shared database architecture, and other types of distributed systems.

Many of the components depicted in FIG. 6B are identical to those in FIG. 6A, and a description of these elements is not repeated here for the sake of brevity. The primary difference between the centralized embodiment and the distributed embodiment is the addition of a separate messaging server 652, which hosts the relevant logic (token generation and/or token authentication logic) 632. The messaging server 652 may be distinct from the communications server 626 but may communicate with the communications server 626, either directly or through the network 624, to provide the functionality of the messaging logic 632 to the communications server 626.

The embodiment depicted in FIG. 6B may be particularly well suited to allow exemplary embodiments to be deployed alongside existing messaging or communication systems, for example when it is difficult or undesirable to replace an existing messaging server. Additionally, in some cases the communications server 626 may have limited resources (e.g. processing or memory resources) that limit or preclude the addition of the additional pivot functionality. In such situations, the capabilities described herein may still be provided through a separate messaging server, such as the messaging server 652.

Messaging Architecture

The embodiments described above may be performed by a messaging architecture, an example of which is next described with reference to FIG. 7.

Figure 7:
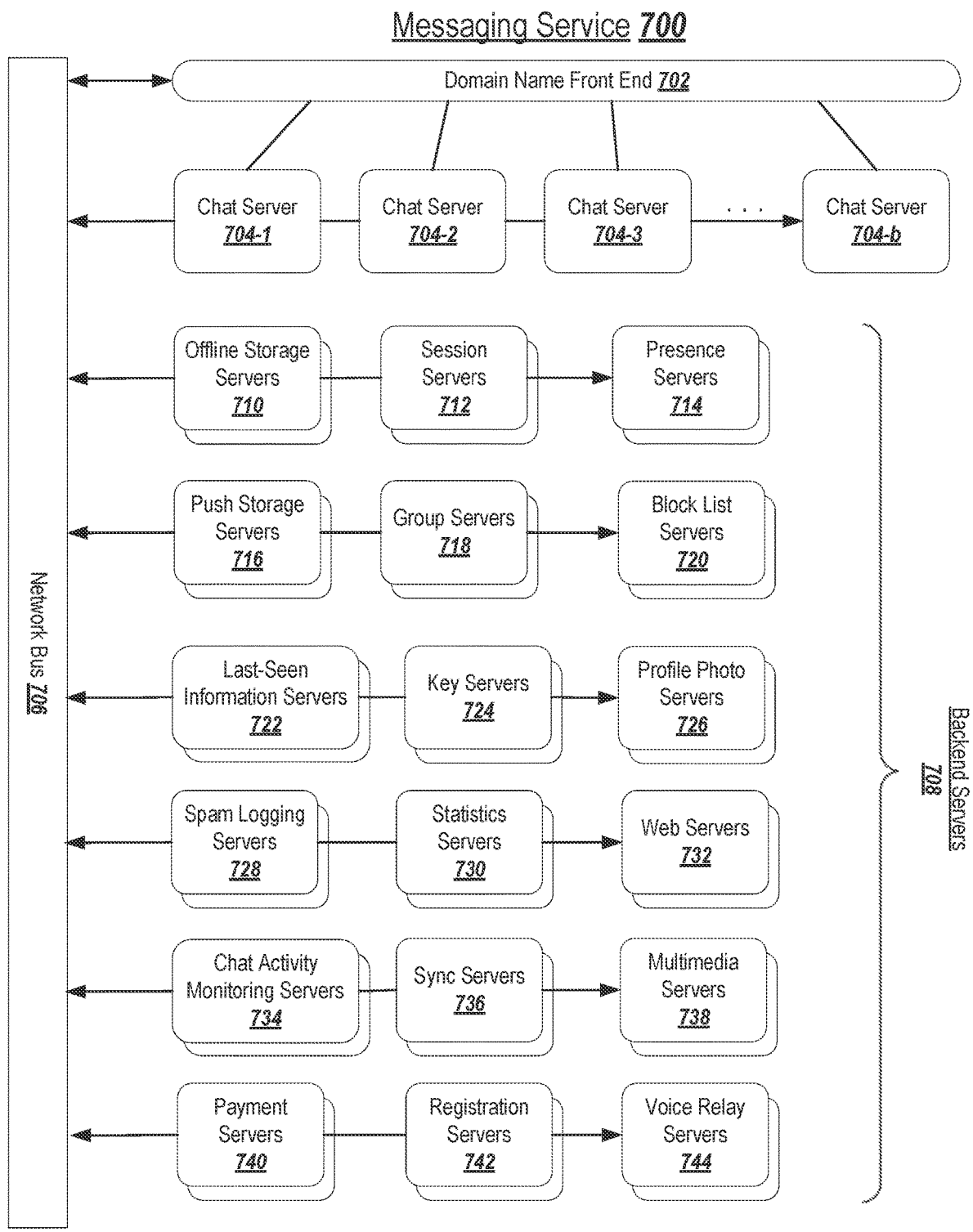
FIG. 7 depicts an exemplary messaging service system.

FIG. 7 illustrates an embodiment of a plurality of servers implementing various functions of a messaging service 700 suitable for use with exemplary embodiments. It will be appreciated that different distributions of work and functions may be used in various embodiments of a messaging service 700.

The messaging service 700 may comprise a domain name front end 702. The domain name front end 702 may be assigned one or more domain names associated with the messaging service 700 in a domain name system (DNS). The domain name front end 702 may receive incoming connections and distribute the connections to servers providing various messaging services.

The messaging service 702 may comprise one or more chat servers 704. The chat servers 704 may comprise front-end servers for receiving and transmitting user-to-user messaging updates such as chat messages. Incoming connections may be assigned to the chat servers 704 by the domain name front end 702 based on workload balancing.

The messaging service 700 may comprise backend servers 708. The backend servers 708 may perform specialized tasks in the support of the chat operations of the front-end chat servers 704. A plurality of different types of backend servers 708 may be used. It will be appreciated that the assignment of types of tasks to different backend serves 708 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 700 may comprise one or more offline storage servers 710. The one or more offline storage servers 710 may store messaging content for currently offline messaging clients in hold for when the messaging clients reconnect.

The messaging service 700 may comprise one or more sessions servers 712. The one or more session servers 712 may maintain session state of connected messaging clients.

The messaging service 700 may comprise one or more presence servers 714. The one or more presence servers 714 may maintain presence information for the messaging service 700. Presence information may correspond to user-specific information indicating whether or not a given user has an online messaging client and is available for chatting, has an online messaging client but is currently away from it, does not have an online messaging client, and any other presence state.

The messaging service 700 may comprise one or more push storage servers 716. The one or more push storage servers 716 may cache push requests and transmit the push requests to messaging clients. Push requests may be used to wake messaging clients, to notify messaging clients that a messaging update is available, and to otherwise perform server-side-driven interactions with messaging clients.

The messaging service 700 may comprise one or more group servers 718. The one or more group servers 718 may maintain lists of groups, add users to groups, remove users from groups, and perform the reception, caching, and forwarding of group chat messages.

The messaging service 700 may comprise one or more block list servers 720. The one or more block list servers 720 may maintain user-specific block lists, the user-specific incoming-block lists indicating for each user the one or more other users that are forbidden from transmitting messages to that user. Alternatively, or additionally, the one or more block list servers 720 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 700 may comprise one or more last seen information servers 722. The one or more last seen information servers 722 may receive, store, and maintain information indicating the last seen location, status, messaging client, and other elements of a user's last seen connection to the messaging service 700.

The messaging service 700 may comprise one or more key servers 724. The one or more key servers may host public keys for public/private key encrypted communication.

The messaging service 700 may comprise one or more profile photo servers 726. The one or more profile photo servers 726 may store and make available for retrieval profile photos for the plurality of users of the messaging service 700.

The messaging service 700 may comprise one or more spam logging servers 728. The one or more spam logging servers 728 may log known and suspected spam (e.g., unwanted messages, particularly those of a promotional nature). The one or more spam logging servers 728 may be operative to analyze messages to determine whether they are spam and to perform punitive measures, in some embodiments, against suspected spammers (users that send spam messages).

The messaging service 700 may comprise one or more statistics servers 730. The one or more statistics servers may compile and store statistics information related to the operation of the messaging service 700 and the behavior of the users of the messaging service 700.

The messaging service 700 may comprise one or more web servers 732. The one or more web servers 732 may engage in hypertext transport protocol (HTTP) and hypertext transport protocol secure (HTTPS) connections with web browsers.

The messaging service 700 may comprise one or more chat activity monitoring servers 734. The one or more chat activity monitoring servers 734 may monitor the chats of users to determine unauthorized or discouraged behavior by the users of the messaging service 700. The one or more chat activity monitoring servers 734 may work in cooperation with the spam logging servers 728 and block list servers 720, with the one or more chat activity monitoring servers 734 identifying spam or other discouraged behavior and providing spam information to the spam logging servers 728 and blocking information, where appropriate to the block list servers 720.

The messaging service 700 may comprise one or more sync servers 736. The one or more sync servers 736 may sync a messaging system (e.g., systems 100, 400) with contact information from a messaging client, such as an address book on a mobile phone, to determine contacts for a user in the messaging service 700.

The messaging service 700 may comprise one or more multimedia servers 738. The one or more multimedia servers may store multimedia (e.g., images, video, audio) in transit between messaging clients, multimedia cached for offline endpoints, and may perform transcoding of multimedia.

The messaging service 700 may comprise one or more payment servers 740. The one or more payment servers 740 may process payments from users. The one or more payment servers 740 may connect to external third-party servers for the performance of payments.

The messaging service 700 may comprise one or more registration servers 742. The one or more registration servers 742 may register new users of the messaging service 700.

The messaging service 700 may comprise one or more voice relay servers 744. The one or more voice relay servers 744 may relay voice-over-internet-protocol (VOIP) voice communication between messaging clients for the performance of VOIP calls.

Figure 8:
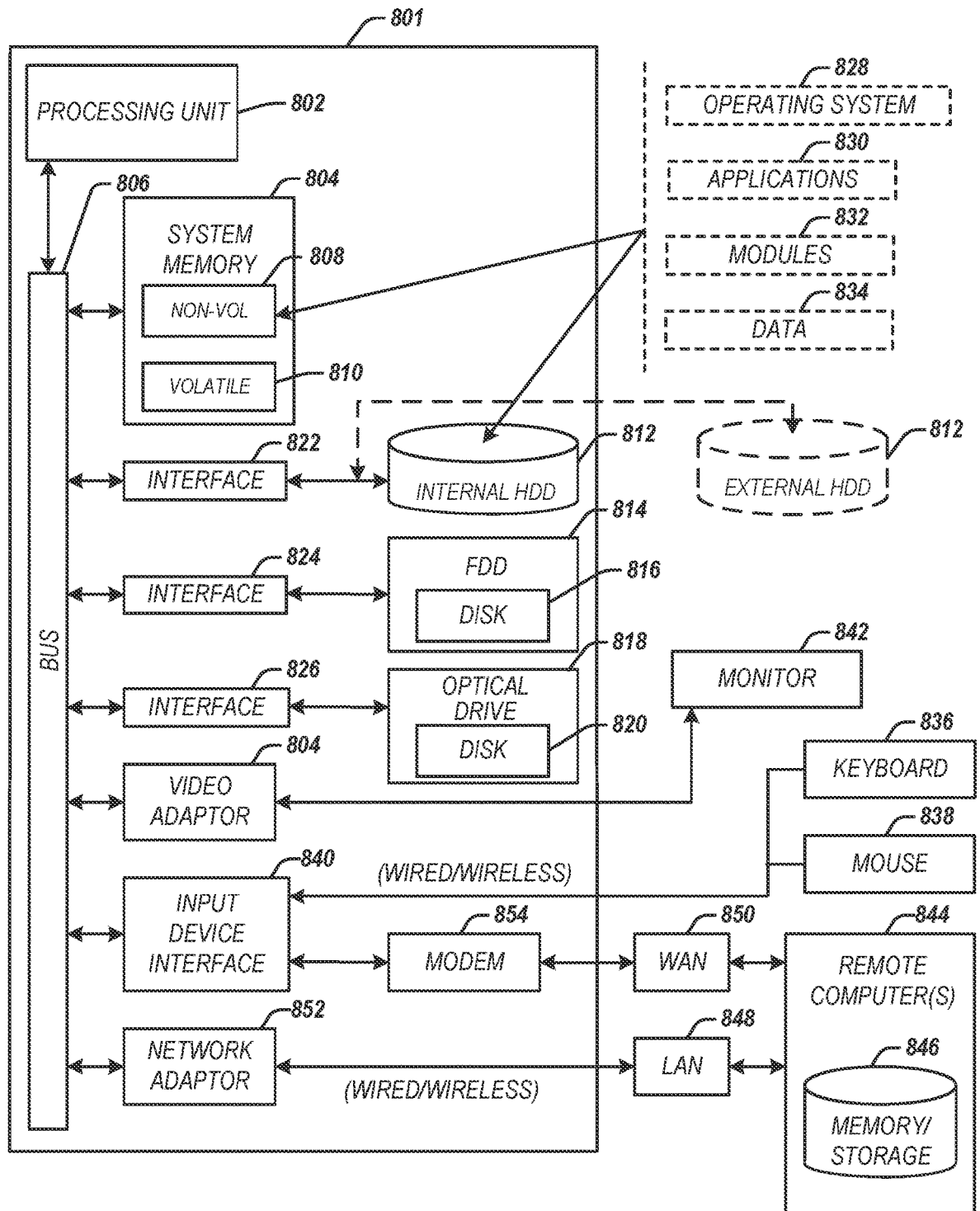
FIG. 8 depicts an exemplary computing architecture.

The above-described examples, features, methods may be embodied as instructions on a computer readable medium or as part of a computing architecture. FIG. 8 illustrates an embodiment of an exemplary computing architecture 800 suitable for implementing various embodiments as previously described. In one embodiment, the computing architecture 800 may comprise or be implemented as part of an electronic device, such as a computer 801. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 802, a system memory 804 and a system bus 806. The processing unit 802 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 802.

The system bus 806 provides an interface for system components including, but not limited to, the system memory 804 to the processing unit 802. The system bus 806 can be any of several types of bus structure that may further interconnect to a memory bus (with or without a memory controller), a peripheral bus, and a local bus using any of a variety of commercially available bus architectures. Interface adapters may connect to the system bus 806 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 804 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 804 can include non-volatile memory 808 and/or volatile memory 810. A basic input/output system (BIOS) can be stored in the non-volatile memory 808.

The computing architecture 800 may include various types of computer-readable storage media in the form of one or more lower speed memory units, including an internal (or external) hard disk drive (HDD) 812, a magnetic floppy disk drive (FDD) 814 to read from or write to a removable magnetic disk 816, and an optical disk drive 818 to read from or write to a removable optical disk 820 (e.g., a CD-ROM or DVD). The HDD 812, FDD 814 and optical disk drive 820 can be connected to the system bus 806 by an HDD interface 822, an FDD interface 824 and an optical drive interface 826, respectively. The HDD interface 822 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 808, 812, including an operating system 828, one or more application programs 830, other program modules 832, and program data 834. In one embodiment, the one or more application programs 830, other program modules 832, and program data 834 can include, for example, the various applications and/or components of the messaging systems 100 or 400.

A user can enter commands and information into the computer 801 through one or more wire/wireless input devices, for example, a keyboard 836 and a pointing device, such as a mouse 838. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 802 through an input device interface 840 that is coupled to the system bus 806, but can be connected by other interfaces such as a parallel port, IEEE 1394 serial port, a game port, a USB port, an IR interface, and so forth.

A monitor 842 or other type of display device is also connected to the system bus 806 via an interface, such as a video adaptor 804. The monitor 842 may be internal or external to the computer 801. In addition to the monitor 842, a computer typically includes other peripheral output devices, such as speakers, printers, and so forth.

The computer 801 may operate in a networked environment using logical connections via wire and/or wireless communications to one or more remote computers, such as a remote computer 844. The remote computer 844 can be a workstation, a server computer, a router, a personal computer, portable computer, microprocessor-based entertainment appliance, a peer device or other common network node, and typically includes many or all of the elements described relative to the computer 801, although, for purposes of brevity, only a memory/storage device 846 is illustrated. The logical connections depicted include wire/wireless connectivity to a local area network (LAN) 848 and/or larger networks, for example, a wide area network (WAN) 850. Such LAN and WAN networking environments are commonplace in offices and companies, and facilitate enterprise-wide computer networks, such as intranets, all of which may connect to a global communications network, for example, the Internet.

When used in a LAN networking environment, the computer 801 is connected to the LAN 848 through a wire and/or wireless communication network interface or adaptor 852. The adaptor 852 can facilitate wire and/or wireless communications to the LAN 848, which may also include a wireless access point disposed thereon for communicating with the wireless functionality of the adaptor 852.

When used in a WAN networking environment, the computer 801 can include a modem 854, or is connected to a communications server on the WAN 850, or has other means for establishing communications over the WAN 850, such as by way of the Internet. The modem 854, which can be internal or external and a wire and/or wireless device, connects to the system bus 806 via the input device interface 840. In a networked environment, program modules depicted relative to the computer 801, or portions thereof, can be stored in the remote memory/storage device 846. It will be appreciated that the network connections shown are exemplary and other means of establishing a communications link between the computers can be used.

The computer 801 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
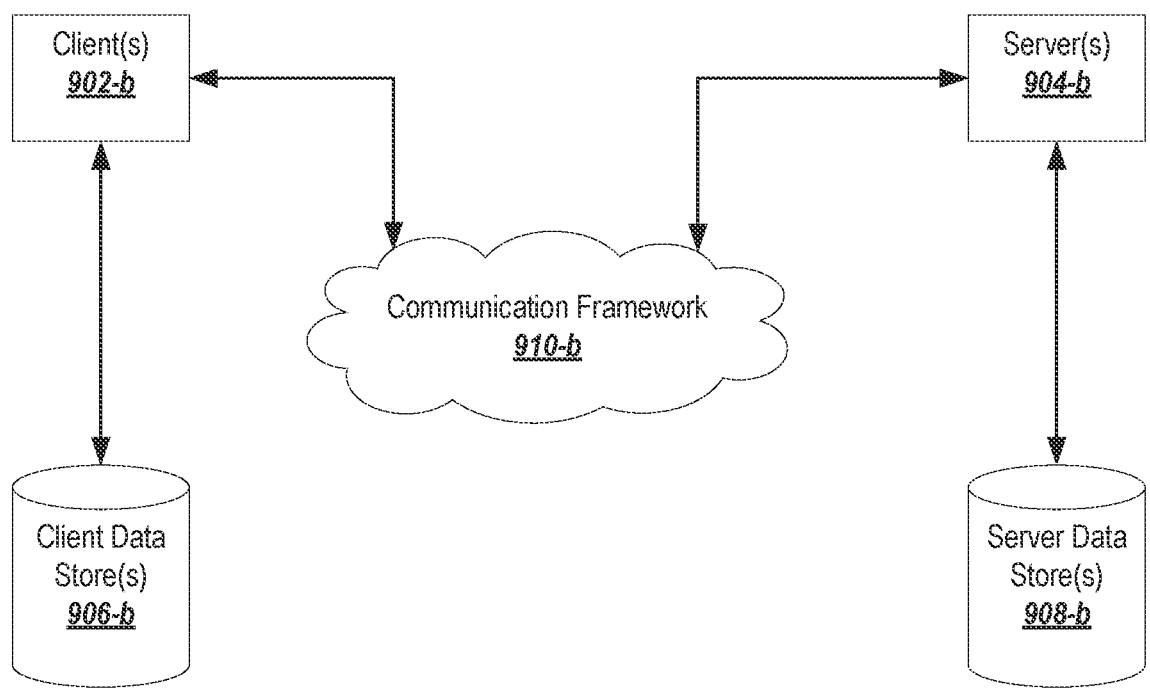
FIG. 9 depicts an exemplary communication architecture.

FIG. 9 is a block diagram depicting an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 includes one or more clients 902 and servers 904. The clients 902 and the servers 904 are operatively connected to one or more respective client data stores 906 and server data stores 908 that can be employed to store information local to the respective clients 902 and servers 904, such as cookies and/or associated contextual information.

The clients 902 and the servers 904 may communicate information between each other using a communication framework 910. The communications framework 910 may implement any well-known communications techniques and protocols. The communications framework 910 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 910 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
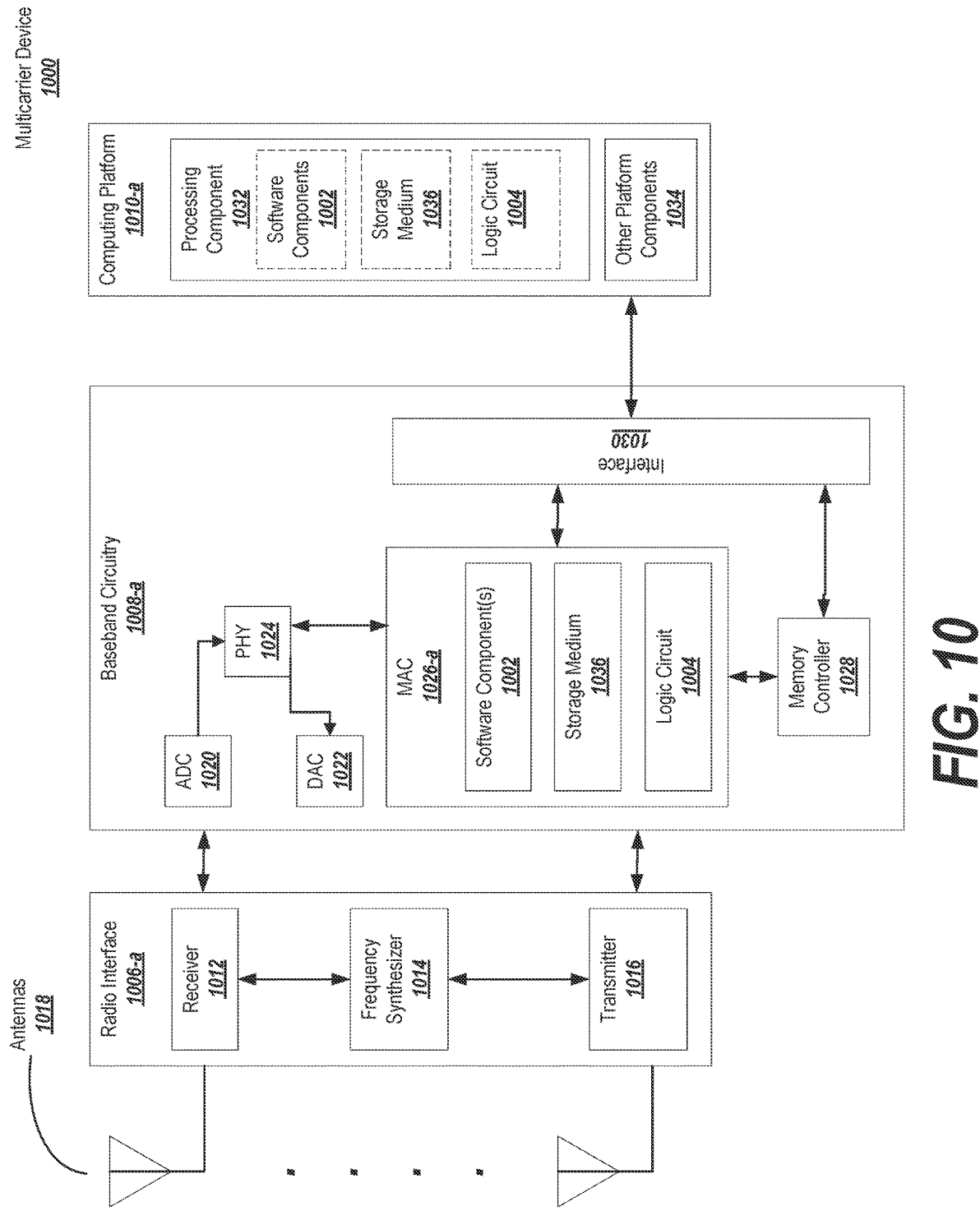
FIG. 10 depicts an exemplary multicarrier communications device.

FIG. 10 illustrates an embodiment of a device 1000 for use in a multicarrier OFDM system, such as the messaging systems 100 or 400. The device 1000 may implement, for example, software components 1002 as described with reference to the messaging logic or any related logic for sending or receiving end-to-end encrypted interactive messages. The device 1000 may also implement a logic circuit 1004. The logic circuit 1004 may include physical circuits to perform operations described for the messaging systems 100 or 400. As shown in FIG. 10, device 1000 may include a radio interface 1006, baseband circuitry 1008, and a computing platform 1010, although embodiments are not limited to this configuration.

The device 1000 may implement some or all of the structure and/or operations for the messaging systems 100 or 400 and/or logic circuit 1004 in a single computing entity, such as entirely within a single device. Alternatively, the device 1000 may distribute portions of the structure and/or operations for the messaging systems 100 or 400 and/or logic circuit 1004 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1006 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 1006 may include, for example, a receiver 1012, a transmitter 1014 and/or a frequency synthesizer 1016. The radio interface 1006 may include bias controls, a crystal oscillator and/or one or more antennas 1018. In another embodiment, the radio interface 1006 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1008 may communicate with the radio interface 1006 to process receive and/or transmit signals and may include, for example, an analog-to-digital converter 1020 for down converting received signals, and a digital-to-analog converter 1022 for up-converting signals for transmission. Further, the baseband circuitry 1008 may include a baseband or physical layer (PHY) processing circuit 1024 for PHY link layer processing of respective receive/transmit signals. The baseband circuitry 1008 may include, for example, a processing circuit 1026 for medium access control (MAC)/data link layer processing. The baseband circuitry 1008 may include a memory controller 1028 for communicating with the processing circuit 1026 and/or a computing platform 1010, for example, via one or more interfaces 1030.

In some embodiments, the PHY processing circuit 1024 may include a frame construction and/or detection module, in combination with additional circuitry such as a buffer memory, to construct and/or deconstruct communication frames, such as radio frames. Alternatively, or in addition, the MAC processing circuit 1026 may share processing for certain of these functions or perform these processes independent of the PHY processing circuit 1024. In some embodiments, MAC and PHY processing may be integrated into a single circuit.

The computing platform 1010 may provide computing functionality for the device 1000. As shown, the computing platform 1010 may include a processing component 1032. In addition to, or alternatively of, the baseband circuitry 1008, the device 1000 may execute processing operations or logic for the messaging systems 100 or 400 and logic circuit 1004 using the processing component 1032. The processing component 1032 (and/or the PHY 1024 and/or MAC 1026) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1010 may further include other platform components 1034. Other platform components 1034 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1000 described herein, may be included or omitted in various embodiments of the device 1000, as suitably desired. In some embodiments, the device 1000 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1000 may be implemented using single input single output (SISO) architectures. However, certain implementations may include multiple antennas (e.g., antennas 1018) for transmission and/or reception using adaptive antenna techniques for beamforming or spatial division multiple access (SDMA) and/or using MIMO communication techniques.

The components and features of the device 1000 may be implemented using any combination of discrete circuitry, application specific integrated circuits (ASICs), logic gates and/or single chip architectures. Further, the features of the device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1000 shown in the block diagram of FIG. 10 may represent one functionally descriptive example of many potential implementations. Accordingly, division, omission or inclusion of block functions depicted in the accompanying Figures does not infer that the hardware components, circuits, software and/or elements for implementing these functions would be necessarily be divided, omitted, or included in embodiments.

At least one computer-readable storage medium 1036 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more exemplary embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method comprising:
receiving a payload requesting to log analytics data, the payload including a token;
authenticating the token, wherein the token is configured for multiple uses during a time period;
generating at least one pseudo-anonymous identifier associated with a user;
receiving a token request from a client device associated with the user;
verifying an identity of the user associated with the client device based on the at least one pseudo-anonymous identifier;
periodically rotating the at least one pseudo-anonymous identifier associated with the user; and
processing the request to log the analytics data in response to successful authentication of the token.

2. The method of claim 1, wherein the authenticating of the token further comprises:
determining whether the token is valid; and
determining whether the token was previously issued.

3. The method of claim 1, wherein the token comprises: a message authentication code (MAC) that includes a secret cryptographic hash algorithm or function.

4. The method of claim 3, wherein authenticating the token further includes:
determining a result of the secret cryptographic hash algorithm or function using information contained in the payload; and
determining whether the result and the token match.

5. The method of claim 3, further comprising:
sending the token to the client device associated with the user based on successful verification of the user.

6. At least one non-transitory computer-readable storage medium comprising instructions that, when executed, cause at least one processor to:
receive a payload requesting to log analytics data, the payload including a first token;
authenticate the first token, wherein the first token is configured for multiple uses during a time period;
generate at least one pseudo-anonymous identifier associated with a user;
receive a token request from a client device associated with the user;
verify an identity of the user associated with the client device based on the at least one pseudo-anonymous identifier;
periodically rotate the at least one pseudo-anonymous identifier associated with the user; and
process the request to log the analytics data in response to successful authentication of the first token.

7. The medium of claim 6, wherein the authentication of the first token further comprises the instructions further causing the at least one processor to:
determine whether the first token is valid; and
determine whether the first token was previously issued.

8. The medium of claim 6, wherein the token comprises: a message authentication code (MAC) that includes a secret cryptographic hash algorithm or function.

9. The medium of claim 8, further comprising authentication of the first token which includes the instructions causing the at least one processor to:
determine a result of the secret cryptographic hash algorithm or function using information contained in the payload; and
determine whether the result and the first token match.

10. The medium of claim 6, the instructions further causing the at least one processor to:
send a second token to the client device based on successful verification of the user.

11. An apparatus comprising:
memory; and
at least one processor operable to execute stored instructions that, when executed, causes the at least one processor to:

receive a payload requesting to log analytics data, payload including a first token;
authenticate the first token, wherein the first token is configured for multiple uses during a time period;
generate at least one pseudo-anonymous identifier associated with a user;
receive a token request from a client device associated with the user;
verify an identity of the user associated with the client device based on the at least one pseudo-anonymous identifier;
periodically rotate the at least one pseudo-anonymous identifier associated with the user; and
process the request to log the analytics data in response to successful authentication of the first token.

12. The apparatus of claim 11, wherein the authentication of the first token further causes the at least one processor to:
determine whether the first token is valid; and
determine whether the first token was previously issued.

13. The apparatus of claim 11, wherein the first token comprises a message authentication code (MAC) that includes a secret cryptographic hash algorithm or function.

14. The apparatus of claim 13, further comprising authentication of the first token which includes the instructions causing the at least one processor to:
determine a result of the secret cryptographic hash algorithm or function using information contained in the payload; and
determine whether the result and the first token-related information match.

15. The apparatus of claim 11, the at least one processor further caused to:
send a second token to the client device based on successful verification of the user.

* * * * *